United States Patent [19]
Haubs et al.

[11] Patent Number: 5,344,702
[45] Date of Patent: Sep. 6, 1994

[54] COATED FIBERS

[75] Inventors: Michael Haubs, Chatham; Walter Hassinger, Annandale, both of N.J.

[73] Assignee: Hoechst Celanese Corp., Somerville, N.J.

[21] Appl. No.: 850,752

[22] Filed: Mar. 13, 1992

Related U.S. Application Data

[63] Continuation-in-part of Ser. No. 582,691, Sep. 14, 1990, Pat. No. 5,156,888.

[51] Int. Cl.$^5$ .......................... A61K 9/70; A61M 1/18; A61M 35/00; B01D 39/14; B01D 67/00; B01D 69/08

[52] U.S. Cl. .................. 428/305.5; 55/528; 422/48; 424/443; 427/245; 428/308.4; 428/311.1; 428/311.5; 428/313.5; 428/315.7; 428/336; 428/376; 428/378; 428/391; 428/394; 428/395; 428/401; 604/265; 604/266; 604/906; 623/12

[58] Field of Search ............... 118/405, 420, DIG. 19; 427/389.9, 393.5, 434.3, 434.5, 434.7, 245; 55/528; 422/48; 424/443; 428/305.5, 308.4, 311.1, 311.5, 313.5, 315.7, 336, 376, 378, 391, 394, 395, 401; 514/964; 604/265, 266, 890, 892, 894

[56] References Cited

FOREIGN PATENT DOCUMENTS 104618 5/1988 Japan .

*Primary Examiner*—James C. Cannon
*Attorney, Agent, or Firm*—Michael W. Ferrell

[57] ABSTRACT

Fibers coated with thin polymeric films are disclosed and claimed. In a preferred embodiment, microporous fibers are coated with a pre-cast polymeric film having a thickness of about 200 to about 2000 Angstroms.

3 Claims, 1 Drawing Sheet

COATED FIBERS

CROSS REFERENCE TO RELATED APPLICATION

This application is a continuation-in-part of an application entitled Method and Apparatus for Applying Polymeric Coating, U.S. Ser. No. 07/582,691 filed Sep. 14, 1990, now U.S. Pat. No. 5,156,888.

FIELD OF INVENTION

The present invention relates generally to fibers provided with a polymeric coating and more particularly to fibers with an ultrathin polymer layer applied thereto.

BACKGROUND ART

It is known in the art to prepare free standing, pinhole-free ultrathin films suitable for separatory applications. In U.S. Pat. No. 4,880,699 to Kohn there is disclosed and claimed, for example, a method of preparing thin polyimide films. Such films are prepared by dissolving the polymer in a solvent, casting the solution on water, and evaporating the solvent. The film so formed can then be readily removed from the water's surface.

A free standing film fabricated in accordance with the foregoing may be difficult to incorporate into commercially attractive structures, for example, into a hollow fiber membrane module useful for gas separation. One alternative approach might be to dip-coat hollow microporous fibers. Such a method, however, would undoubtedly have the disadvantage that the polymer the coating. Another possibility for applying thin, continuous cast membranes to a hollow fiber would be mechanical wrapping. This method is arduous at best, and coating thicknesses and film quality would largely be determined in the casting step.

In Japanese laid-open application No. 63-104618 of Kawada et al. there is disclosed a method of producing hollow fiber composite membranes. The method shown involves continuously casting a thin film on water and passing a microporous hollow fiber through the polymer solution in a region where the polymer/solvent solution possesses fluidity. The solution deposits a thin film on the membrane while excess polymer is taken up and stored. The system utilized by Kawada et al. does not address the issues of depositing a thin film uniformly about the periphery of a hollow fiber as would be required for high quality separation membranes. Moreover, significant control and recycling of polymer would be required, making the system difficult to automate or even produce commercially suitable product.

SUMMARY OF THE INVENTION

In accordance with the present invention, fibers are coated by providing a polymer solution to the surface of a liquid bath to form a polymeric layer on the surface of the bath thereby creating a film, and drawing a fiber therethrough. The polymer solution is radially advanced to a central point where the fiber is drawn through the film so that there is deposited a film of uniform thickness on the fiber about its entire periphery. In a preferred embodiment, the polymer is supplied at a rate and in amounts such that all of the polymer supplied to the bath is deposited on the fiber, while the solvent is partially evaporated. The inventive method is particularly useful for coating hollow microporous fibers for making composite articles. The pre-cast film does not penetrate the pores and thus films of predetermined and uniform thickness may be achieved. As used herein, the term fiber refers to longitudinal bodies such as tubes, monofilaments and the like as well as thread-like articles of manufacture. Such bodies may be porous or non porous.

BRIEF DESCRIPTION OF DRAWING

The invention is described in detail below with reference to the single figure which is a schematic view in elevation and section of an apparatus used in connection with the present invention.

DETAILED DESCRIPTION

Figure 1:
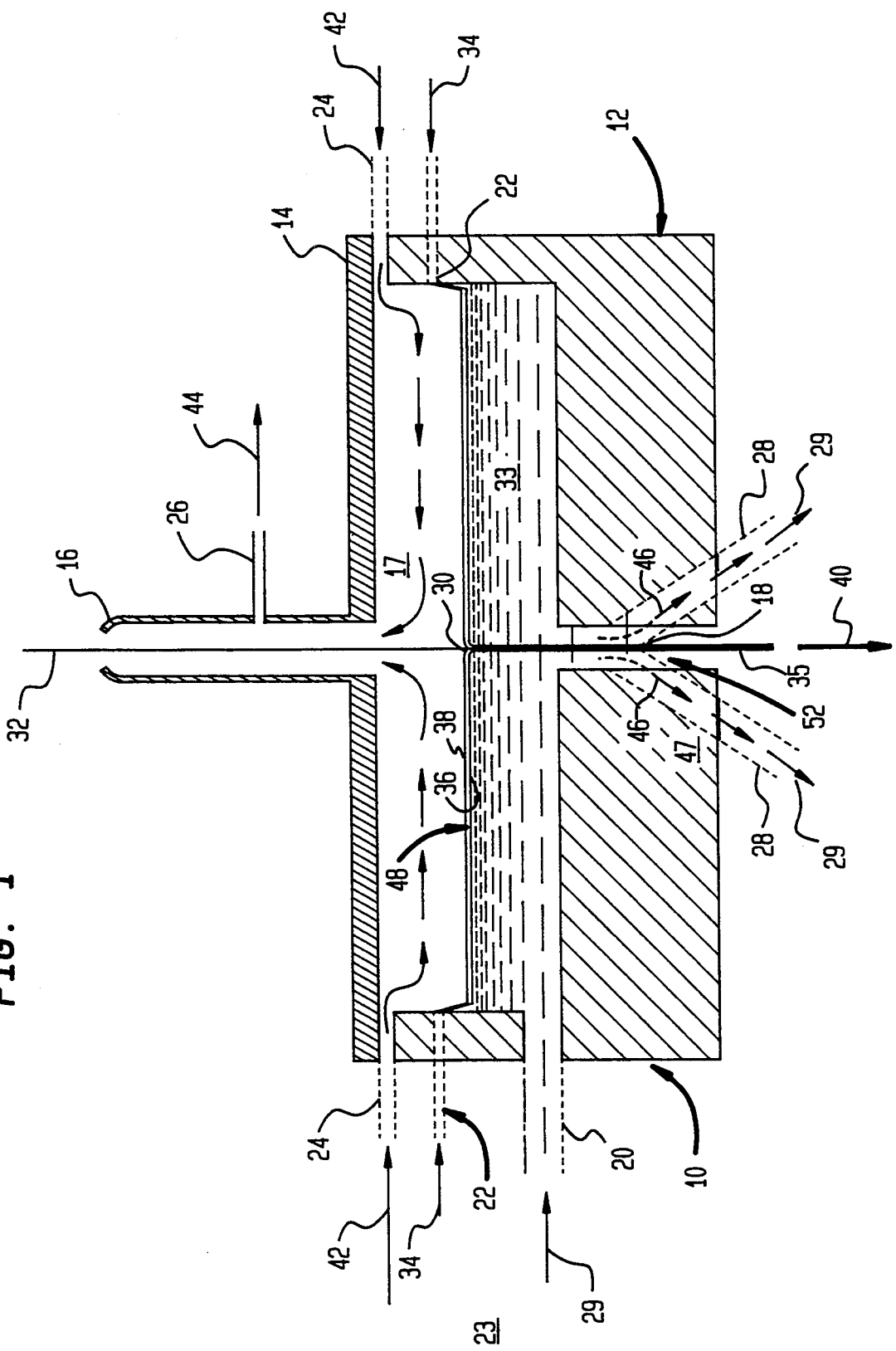

The present invention will now be described with reference to a specific embodiment involving coating a polypropylene fiber with a polyimide polymer coat or layer. It is to be understood, however, that such description is for purposes of exposition and not for purposes of limitation. It will be readily understood that the inventive concept is equally applicable to other systems, such as applying multiple coatings to a polymethacrylate fiber to produce a graded index optical fiber, or to applying coating to polyester, polyolefin fibers or the like consisting of any polymer capable of forming a film atop a bath.

An apparatus 10, schematically depicted in FIG. 1, is an apparatus for continuously coating a fiber with a pre-formed film. Apparatus 10 includes a feed roll (not shown) a cylindrical bath container 12 provided with a top portion 14 to define interior plenum chamber 17. There is a fiber inlet 16 at the top and an exit hole 18 below the bath. A fiber 32 enters at 16 and exits hole 18 and is conveyed to a drying area (not shown). Typically, the coated fiber is dried to remove residual solvent as well as drive off any liquid from the bath.

Bath container 12 is conveniently provided with a bath liquid inlet 20, and a polymer feed port 22, preferably there are four such ports spaced equally about the periphery of the bath to ensure good distribution of polymer solution about the circumference of the bath. Polymer is fed from a reservoir indicated at 23. To achieve desired feed rates it is convenient to use a mechanized syringe-type feeder. There is additionally provided a nitrogen gas inlet 24 and a gas outlet 26.

In operation a polymer solution is prepared and fed from one or more reservoirs 23 through one or more feed ports 22 onto a surface 36 of a bath 33 as shown in the direction indicated by arrows 34. While any suitable materials may be used, preferred polymers for coatings include polyimides, polyesters, polysulfones, polyetherketones, polycarbonates, polyolefins, polyamides and the like and the fibers to be coated may be the same or a different material. Glassy polyimides and the like are particularly preferred. A variety of organic solvents may be used and it is useful to use a surface active agent in the polymeric solution for purposes of continuous casting and coating. Such agents may be of the various known surfactant types, of the anionic, cationic, polyoxyethylene, semipolar, or zwitterionic class for example, including such compounds as sodium dodecyl sulfate, trimethyl dodecyl ammonium chloride, a condensation product of 1 mole dodecyl alcohol with 10 moles of ethylene oxide, dimethyl dodecyl amine oxide, dimethyl dodecyl ammonium propionate or like compounds. Surface active agents of the polysiloxane type or those with a perfluorinated hydrophobic portion are particularly preferred.

Apparatus 10 may be operated with various feed rates of polymer generally in the range of about 0.05 to about 20 microliters per second; 0.2 to about 3 microliters per second being preferred. The solution employed may be of any suitable concentration such that a film 38 remains in a swollen, low viscosity state as further discussed herein. Generally, this is achieved by using a solution generally of about 0.1 to about 30 weight per cent polymer and typically of from about 1 to about 10 weight per cent polymer at the inception of the process and allowing a partial evaporation of the solvent before the polymeric layer contacts the fiber to be coated. It is important to maintain the polymeric layer in a low viscosity, highly flexible state when it contacts the fiber, but not so dilute that it will wick into the micropores which leads to non uniform thickness. Preferred concentrations at the inception of the process are from about 2 to 4 weight per cent polymer and most preferably from about 2.5 to about 3.5 weight per cent polymer.

While film 38 is forming on the bath, liquid flow is initiated, originating at 20 and exiting apparatus 10 at 28 after flowing through a separator portion 46 of a conical area 47 which also defines central hole 18. Flow direction is indicated by arrows 29. Liquid flow may or may not be required for a given system and may be adjusted by a valve or any suitable means to adjust a vortex 30 formed at a central area 48 of the bath. Vortex 30 is at the central axis of cylindrical bath 12 in the apparatus shown. Liquid flow and the resulting vortex formation is not essential to practicing the inventive process generally, provided that the feed rate of polymer and fiber is suitably controlled along with the viscosity and structural integrity of film 38. In many cases, however, it is preferable to have a vortex since this will impart radial and tangential forces to the film in order to help adhere film 38 to a fiber 32 that is to be coated. The shape and dimension of the vortex may be readily adjusted by altering flow rates and the geometry of the system. The liquid used for forming the bath is typically, but not necessarily water, and may or may not be partially miscible with the polymer solution. Since pre-cast films are generally preferred it is usually required that the bath liquid be immiscible with the polymer solution; as is the case with the illustrative example described hereinafter. The cast film should generally contain residual solvent when it contacts the fiber to promote adhesion. Excess solvent can be evaporated later to obtain a polymer coating of predetermined thickness.

Before film 38 reaches central vortex 30, typically, fiber 32 is fed through inlet 16 and out through hole 18 at the desired linear feed rate. Fiber 32 may be any suitable fiber such as a polyolefin or substituted polyolefin such as poly (acronitrile) or a polyamide, polyimide, polycarbonate, polyester, polysulfone, polyether ketone, or mixtures or composites thereof and may be of a diameter to minimize leakage through hole 18 if so desired. Generally, fiber 32 is fed at a linear rate of from about 0.5 to about 100 cm/sec with a speed of about 10 cm/sec being typical. Fibers of any diameter may be used, 500 microns being typical with the feed rates of polymer solution recited above; to produce uniform coatings of from about 100 angstroms to 5 microns in thickness.

To coat fiber 32, polymer is continuously fed so that film 38 reaches vortex 30 as fiber 32 is fed therethrough. Film 38 contacts the fiber 32 at 30 and adheres thereto to produce a coated fiber 35 as schematically depicted. During this process, nitrogen is circulated as indicated by arrows 42, and 44 through an inlet 24 and out an exit 26. The atmosphere may be recirculated or enriched with solvent vapor if necessary to maintain a significant partial pressure of solvent above the bath so that the film does not become too stiff.

After exiting outlet 18 and proceeding to area 52, the fiber is dried if necessary and may be re-coated by conveniently switching the take-up and feed rolls if multiple coatings are desired in accordance with the present invention either very thin coatings can be prepared, or if so desired, thicker films may be applied, for example, multiple coatings of cladding layers of different refractive index may be used on a core material to produce a graded optical fiber. Especially preferred embodiments of the present invention are those in which substantially all of the polymer film cast on the bath is applied to the fiber in a continuous process or a steady state is otherwise achieved. In such cases, the thickness of the film may be readily predicted by the way of a mass balance so that the desired thickness can be achieved.

While the film is forming on the bath and being radially advanced on the water to the central region 48, the solvent partially evaporates into the nitrogen atmosphere of interior chamber 17. Inasmuch as the linear speed and/or thickness of polymeric film layer 38 must change as the film forms, spreads and is conveyed to fiber 16, it is important not to evaporate too much solvent or the film will harden and continuous operation leading to a useful product cannot be achieved. Polymeric layer 38 should thus be maintained in a low viscosity state throughout the process as compared to an unswollen polymer which is termed a sufficiently low viscosity herein. If the amount of evaporation is too high the film will not maintain sufficiently low viscosity on a cylindrical bath and the coating will come to a standstill since the film is too brittle. On the other hand, if the film solution 38 is too dilute when it contacts the fiber, the film may wick into the pores of the fiber or not have enough structural integrity to act a pre-cast film as is desired.

Preferably, the solvent is partially evaporated from the polymer solution during processing as in the nitrogen atmosphere of the plenum shown in FIG. 1. This can be achieved by either controlling the $N_2$ flow or by use of a solvent mixture of a high and low boiling solvent. The polymeric layer is radially advanced from all directions equally to central region 48 so that coatings of uniform thickness are achieved about the entire circumference of coated fiber 35.

In preferred embodiments, the bath is drained at a central coating point so that the polymeric layer is radially transported to a circumferential vortex defined about the fiber and a uniform, tightly adhered coating is achieved. If insufficient solvent is present at the coating region, adhesion may suffer.

To achieve coatings of uniform thickness about the entire periphery of the fiber it will be appreciated that radially advancing the film 38 refers to the fact that the polymer film is approaching fiber 32 from all directions about 360 degrees in the plane of the bath equally, that is, the mass flux is constant about 360 degrees from the fiber as the central point of a circle or in other words, that there is a substantially constant mass flux rate inwardly about coating region 30 at any given radial direction. If there is insufficient solvent remaining in film 38 as it approaches the coating area, it has been found that it is not possible to maintain a constant mass flow rate. In order to control and optimize the coating process it has been found most useful to use a fluorescent dye such as a substituted cumarin in low concentrations and observe the coating process under UV light.

The inventive system is in many respects self-stabilizing in the sense that the system will tend to correct itself to the desired characteristics; for example, if the vortex and inward flow of the bath is not optimal for a particular system because liquid flow of the bath is too low, the amount of polymer deposited on the fiber will still be as desired because the poller solution will distribute itself properly because of gravity and flow inwardly as the inner portions of film 38 are removed by the moving fiber provided the viscosity is proper.

The present invention is further illustrated in connection with the following example.

ILLUSTRATIVE EXAMPLE

A polymer solution was prepared containing 2.5 wt. per cent of a polyimide which was the condensation product of 2,2 bis(4-aminophenyl) hexafluoropropane and 2,2 bis(3,4-dicarboxyphenyl) hexafluoropropane dianhydride (as described in copending application U.S. Ser. No. 462,272 filed Dec. 21, 1989 and published as European Application Publication No. 0355 367 on Feb. 28, 1990 the disclosure of which is incorporated herein by reference) in a 50/50 mixture of 1,2,3-trichloropropane and butyl acetate as the solvent, and $3 \times 10^{-2}$ weight per cent of Perenol 54 a surface active agent manufactured by Henkel Corp., Amblers, Pa., which is a polysiloxane type of surface active compound, as a processing aid.

In order to coat the fiber, the solution as prepared above and represented by arrows 34 was added to surface 36 of the bath as shown at constant rate of 1 microliter per second by way of a syringe type feeder while simultaneously, fiber 32, a hollow microporous polypropylene fiber was drawn through the polymeric film layer 38 at a rate of 10 cm/sec as shown by arrow 40 and nitrogen is circulated as shown by arrows 42 and 44. The microporous fiber employed is marketed by Hoechst-Celanese Corporation, 86 Morris Avenue, Summit, N.J. 07901 under the trademark and designation Celgard ® 2400. This fiber has a diameter of about 500 microns and an effective average pore size of about 0.02 microns.

As part of the process, water was gently added to the bath at 20 and withdrawn at 46 and 28 so that centrally located vortex 30 is created as the film is transported to the fiber. The rate of addition of polymer, water circulation and fiber speed are carefully adjusted so that the film is uniform about the circumference of coated fiber 35 and all of the polymer in the film is applied to the fiber.

One of the many advantages of the present invention is that the uniform coating thickness can be readily adjusted in steady-state cases where all of the polymer is applied to the fiber since the coating thickness can be easily calculated by way of a steady-state mass balance.

The inventive method is uniquely suited for producing fibers with thin polymeric coatings, especially when the fibers are porous. Unlike solution or melt coating methods, the pre-cast film of the present invention does not penetrate pores having openings of from about 50 to 500 Angstroms. Such openings may be circular, in which case the above dimensions are diameters of the pores, or other shapes in which case the above dimensions would be the side to side or end to end dimensions of the pores. It has been found in general, that a solution fiber coating process or melt coating process (such as dipping in polymer or poller solution) inherently produces a wet film thickness of about 20 microns or 200,000 Angstroms. If a thinner membrane is desired, it may be achieved, for example, by diluting a polymer solution to low levels. If a 10% polymer solution were applied to a fiber for example, even thought the as-applied wet thickness might be 20 microns, a final thickness of about 2 microns might be achieved. However, the evaporation of solvent from the composite body is likely to cause non-uniformities in the film.

On the other hand, since films are applied directly in accordance with the present invention, thin films are readily achieved, even on porous substrates. This feature is exceedingly useful for gas separation as discussed above, and is also useful in biomedical applications where thin films may be desired due to the need for high diffusivity or the expensive nature of biocompatible materials or bioerodible materials or the desire for low dose levels as will readily be understood by one of skill in the art.

Blood oxygenators, for example, require outstanding transport properties as well as biocompatibility. A suitable membrane may be made in accordance with the present invention wherein an outer coating layer that is highly thromboresistant is utilized. Such a layer may be inherently thromboresistant or readily biolizable to a biocompatible material. Likewise, catheters and tubing used in vivo desirably have a biocompatible surface. Inherently thromboresistant resistant polymers which may be used in accordance with the present invention include polydimethylsiloxane, polyalkylsulfone, perfluoroacyl ethyl cellulose, Ioplex 101, poly(2-hydroxyethyl methacrylate), polyacrylamide, polyether polyurethane urea, heparin and various hepranized polymers as described in the Kirk-Othmer Encyclopedia Vol. 19, pp. 279 et. seq. (Wiley, 1982).

Other materials which might be used as coating materials include natural tissues such as collagen, gelatin, or albumin which is biolized either before or after the inventive coating process. Typically, biolization is achieved by heat treatment of the natural tissue with an aldehyde such as formaldehyde or glutaraldehyde.

In addition to blood oxygenation, the inventive fibers of the present invention may be used in connection with controlled-release of pharmacological agents. Bioerodable polymeric coatings including polyanhydrides and polyesters such as poly(glycolic acid), poly(L-lactic acid), poly(D.L. ethylglycolic acid) and those other polymers listed in the Encyclopedia of Polymer Science and Engineering, Supplement Volume, p. 170 et. seq. (Wiley, 1985) may be used. In such applications, the active agent is released as the polymer erodes.

Alternatively, a hollow porous fiber with a thin, permanent polymeric coating may be used as a reservoir-type diffusional delivery system when a pharmacologically active agent is incorporated into the central cavity of the fiber. In such applications, the coating may be a polyacrylate or a polymethacrylate.

In accordance with the present invention, the polymeric coating when applied to the fiber typically contains some solvent such that the as applied thickness of the film, that is immediately when in contacts the fiber, is greater than the cured thickness of the film, that is, when the solvent is fully evaporated.

Generally speaking, the films are typically applied in thickness of from about 100 to about 20,000 Angstroms; perhaps from about 200 to about 5000 Angstroms being preferred. Cured coatings preferably have thickness of from about 200 to about 2000 Angstroms, from about 400 to about 1,000 Angstroms being particularly preferred in many cases.

While microscopically continuous coatings are sought in many applications, it is possible to apply a continuous polymeric coating in accordance with the invention to achieve an ultraporous or microporous membranous coating, that is, a film coating provided with pores smaller than about 500 Angstroms. This is achieved by incorporating a ultrapore-forming agent into the solution used to form the polymeric film coatings of the invention. The pore forming agent may be a high boiling non solvent for the polymer or an emulsion. Of course, using an emulsion with larger micelles may be preferable if larger pores are desired. Such films although having pores are substantially uniform in thickness about the periphery of the fiber in the sense that the thickness of the solid portions is substantially constant.

While the invention has been described in detail hereinabove various modifications will be apparent to those of skill in the art.

We claim:

1. A composite membranous structure comprising in combination a hollow microporous fiber having pores with dimensions of from about 50 to about 500 Angstroms and thereupon, a thin film polymeric coating uniformly adhered about the circumference of the fiber, wherein said film has a cured thickness of from about 200 to about 2000 Angstroms in thickness and includes a bioerodible polymer.

2. A fiber provided with a polymeric coating, which coating is applied by a process comprising providing a fluid bath capable off receiving on its surface a polymer solution, applying a polymer solution to the surface of said bath, said solution and said bath cooperating such that said solution forms a polymeric film layer on the surface of said bath, radially advancing the polymeric film layer to a coating region of the bath, drawing a fiber through said film layer at said coating region, wherein said fiber is provided with a film coating of substantially uniform thickness about its periphery adhered about the entire circumference of the fiber, said rate of application of polymer to the surface of the bath is substantially equal to the rate of application of polymer to said fiber and said film coating has an as applied thickness of from about 100 to 20,000 Angstroms and wherein said polymeric coating includes a bioerodible material.

3. The coated fiber according to claim 2, wherein said bioerodible material is a bioerodible polymer.

* * * * *